(12) United States Patent
Rajewski (10) Patent No.: US 7,618,000 B2
(45) Date of Patent: Nov. 17, 2009

(54) POWERING SYSTEM FOR VEHICLE CARRIED PAPER SHREDDER

(76) Inventor: Max R. Rajewski, 6654 Elijah Rd., Wellpinit, WA (US) 99040

( * ) Notice: Subject to any disclaimer, the term of this patent is extended or adjusted under 35 U.S.C. 154(b) by 328 days.

(21) Appl. No.: 11/786,010

(22) Filed: Apr. 10, 2007

(65) Prior Publication Data

US 2007/0249441 A1    Oct. 25, 2007

Related U.S. Application Data

(60) Provisional application No. 60/790,573, filed on Apr. 10, 2006.

(51) Int. Cl.
*B02C 21/02* (2006.01)
(52) U.S. Cl. ............... 241/36; 241/101.2; 241/101.741
(58) Field of Classification Search ............... 241/36, 241/101.2, 101.741, 100, 236
See application file for complete search history.

(56) References Cited

U.S. PATENT DOCUMENTS

| 3,189,286 | A | * | 6/1965 | O'Counor | 241/56 |
| 5,871,162 | A | * | 2/1999 | Rajewski | 241/100 |
| 6,719,226 | B2 | * | 4/2004 | Rajewski | 241/30 |
| 7,198,213 | B2 | * | 4/2007 | Kolbet et al. | 241/101.741 |

* cited by examiner

*Primary Examiner*—Mark Rosenbaum
(74) *Attorney, Agent, or Firm*—Bergman & Jeckle, PLLC (57) ABSTRACT

A powering system for a paper shredder carried by a vehicle having a two speed rear differential provides a power takeoff driven by a drive pulley irrotatably carried on a medial drive line shaft inserted between the vehicle forward and rearward drive line shafts. The range selector of the differential is modified to have a null position between speed ranges whereat rotational motion of drive line is not communicated through the rear differential to vehicle axles and wheels. An air bag carried powered by the vehicle pneumatic system selectively tensions and slackens drive belt tension to engage and disengage the power takeoff. Auxiliary apparatus to load unshredded paper into a storage area, feed the unshredded paper to the shredder and unload shredded paper from the vehicle are electrically powered by vehicle rechargeable batteries through switching means to regulate motor starting, stopping and reversing and to regulate shredder speed.

7 Claims, 6 Drawing Sheets

FIG. 9

POWERING SYSTEM FOR VEHICLE CARRIED PAPER SHREDDER

RELATED APPLICATIONS

This application claims priority from U.S. Provisional Application Ser. No. 60/790,573, filed Apr. 10, 2006. There are no other applications related hereto heretofore filed in this or in any foreign country.

BACKGROUND OF THE INVENTION

1. Field of Invention

The present invention relates to motor vehicles and more particularly to powering systems that use the vehicle engine to power a vehicle carried auxiliary mechanism and more particularly a paper shredder.

2. Background and Description of Prior Art

Commercial truck type motor vehicles are often equipped with auxiliary mechanical systems that use the vehicle engine to power the auxiliary system such as water pumps on fire trucks, trash compactors on refuse collection trucks and paper shredders on office waste removal trucks. Trucks equipped with such auxiliary mechanical systems generally power the auxiliary system with power takeoff (PTO) equipment that, at the selection of the operator, directs power from the vehicle engine to the auxiliary system.

Commonly PTO equipment is hydraulically activated which requires hydraulic pumps interconnected with a vehicle power train by a gearbox or other mechanical linkage, hydraulic hoses with related valves and fittings, and a reservoir having a cooler for hydraulic oil. As a result, hydraulic PTO systems are complex, bulky, and heavy. Although hydraulic systems provide substantial amounts of torque, such systems generally do not generate high rotary speeds.

PTO mechanisms may also be mechanical with plural interconnecting gears, clutches and shafts, commonly called a PTO transmission. PTO transmissions are generally able to generate higher rotary speed levels than hydraulic PTO systems, but they are generally more complex and have greater mechanical wear. PTO transmissions are also generally heavy, bulky, and typically are available only as original equipment on vehicles which makes retrofitting a truck with a PTO transmission to power an auxiliary system expensive and difficult.

Another drawback to known hydraulic PTO systems and PTO transmissions is noise, especially when either mechanism is powering a paper shredding apparatus. Typically the noise is characterized by a "high pitched squeal" caused by the hydraulic fluid passage and motion of PTO system components. Because paper shredding operations are frequently conducted in urban areas, noise is a regulatory problem because it is classified as "pollution" in some jurisdictions. Additionally, the bulkiness and weight of known hydraulic PTO systems and PTO transmissions reduce the amount of shredded paper a truck may carry. Because commercial trucks are limited in weight carrying capacity, a lighter and smaller PTO system increases the amount of shredded paper that may be carried to increase productivity. Further, a large reservoir of hydraulic fluid poses a spill risk in the event of a vehicular accident or mechanical breakdown posing an environmental risk.

Paper shredding systems also require auxiliary mechanisms to move unshredded paper into a storage area prior to shredding, to feed the paper to a shredder, to move the shredded paper to a storage area and to unload shredded paper from the storage area. In known paper shredding systems these auxiliary mechanisms are generally power by hydraulic rams to further increase the bulk and weight of the paper shredding system, responsively reducing the amount of shredded paper the truck may carry and increasing the number of fastenings and fittings where a spillage of hydraulic fluid may occur.

The instant invention seeks to resolve these and other disadvantages inherent in known PTO systems and PTO transmissions by using an endless flexible belt transmission system communicating with the vehicle drive shaft to power a PTO assembly. A gear range selector on a vehicle's multi-speed rear differential is modified to have a neutral position between gear ranges wherein the rotational motion of vehicle drive line is not passed through the rear differential to the vehicle wheels. A drive pulley irrotatably carried by the drive shaft communicates with the PTO assembly by an endless drive belt and the PTO assembly thereafter powers the paper shredder by means of another endless belt.

Pneumatic operation of the modified multi-speed rear differential provides a safety feature because the gear range selector is spring biased toward the neutral position. Accordingly, failure of vehicle pressurized air system causes the modified gear range selector to remain in neutral.

Auxiliary mechanisms that move unshredded and shredded paper are powered by an electrical system comprising two six volt batteries interconnected in series to supply 12 volts of power at high amperage to the electric motors powering the auxiliary mechanisms. Powering the auxiliary mechanisms electrically eliminates the need for hydraulic rams and related fittings to further reduce the weight of the system as compared to known hydraulic PTO systems. Toggle switches and solenoids permit the operator to control movement of the auxiliary mechanisms.

As compared to prior truck mounted hydraulically or mechanically powered paper shredders, the instant invention is less noisy, generates high rotary speed levels, weighs less, is smaller and does not pose an environmental risk of oil spillage. The instant invention allows the truck to carry more shredded paper, operate under more restrictive pollution and noise control ordinances and provide a more efficient paper shredding operation.

My invention does not reside in any of the foregoing features individually but rather in the synergistic combination of all of its structures which necessarily give rise to the functions flowing therefrom as herein specified and claimed.

SUMMARY OF INVENTION

The instant powering system comprises an engine driven power takeoff (PTO) system and an auxiliary electrical system, both to power a vehicle carried paper shredder. A drive pulley irrotatably carried by a medial section of a segmented drive line interconnecting the vehicle engine and rear differential carries a main drive belt communicating with the PTO system carried by the vehicle frame. The rear differential is a two speed type with a pneumatically operated range selector optionally maintained in gear for vehicle movement and maintainable in neutral when motion of drive line is not communicated through the rear differential to the vehicle wheels for movement.

An airbag housing, having an air bag controlled by vehicle pneumatic system, is interconnected with a movable belt tightening carriage journaling a belt tightening pulley communicating with the main drive belt between drive pulley and PTO assembly. Responsive to operator controlled expansion and contraction of air bag, the belt tightening carriage moves to create and take up slack in main drive belt to selectively cause rotational motion of the drive pulley to be communicated to the PTO assembly.

Auxiliary mechanisms to move unshredded paper into a first storage area, feed paper into the shredder and unload shredded paper from a second storage area are operated by electric motors having known mechanical linkages operatively interconnected with the auxiliary electrical system to generate desired motion at operator selection. The auxiliary electric system is powered by plural series connected batteries operating through known switching and control devices.

In providing such a powering system, it is:

a principal object to provide a powering system for a vehicle carried paper shredder that uses the vehicle engine to power the paper shredder by modifying the gear range selector on the vehicle rear differential to create and selectively maintain a neutral position wherein drive line motion is not imparted to the vehicle wheels so that the drive line may power the paper shredder.

A further object is to provide such a powering system that uses an endless belt to interconnect a drive pulley, irrotatably carried by the vehicle drive line, with a power takeoff to power the paper shredder, the endless belt being tensioned and loosened at operator selection by a belt tensioning pulley moved by an airbag powered by the existing vehicle pneumatic system.

A further object is to provide such a powering system that may use the vehicle cruise control and shift mechanisms to regulate the rotary speed communicated to the PTO.

A further object is to provide such a powering system that has an electrical system with electric motors to operate auxiliary mechanisms to load unshredded paper into a first storage area, feed the paper shredder and empty shredded paper from a second storage area.

A further object is to provide such an electrical system that uses batteries interconnected in series and controlled by switching means to give an operator the option to reverse direction of operation of the auxiliary mechanisms.

A further object is to provide such a powering system that is smaller and lighter than known PTO systems for vehicular paper shredders so that the paper carrying capacity of the vehicle is increased.

A still further object is to provide such a powering system that is less noisy than known powering systems to allow operation in urban business areas in compliance with noise pollution ordinances.

A still further object is to provide such a powering system that is of new and novel design, of a rugged and durable nature, of simple and economic manufacture and one that is otherwise well-suited to the uses and purposes for which it is intended.

Other and further objects of my invention will appear from the following specification and accompanying drawings which form a part hereof. In carrying out the objects of my invention it is to be understood that its features are susceptible to change in design, order and arrangement with only one preferred and practical embodiment of the best known mode being illustrated in the accompanying drawings and specified as is required.

BRIEF DESCRIPTION OF THE DRAWINGS

In the accompanying drawings which form a part hereof and wherein like numbers of references refer to similar parts throughout.

DESCRIPTION

As used herein, the term "forword", its derivatives, and grammatical equivalents refers to that portion of apparatus positioned toward front portion of a motor vehicle. The term "rearward", its derivatives, and grammatical equivalents refers to that portion of the apparatus positioned toward rear portion of a motor vehicle. The term "outer", its derivatives, and grammatical equivalents refers to a driver side or passenger side of a motor vehicle as opposed to a laterally medial portion of a motor vehicle.

My powering system for a vehicle carried paper shredder is generally comprised of truck type motor vehicle 10 having engine 14 at a forward end portion, two speed rear differential 30 having gear range selector 11 carried thereon, segmented drive line 12 interconnecting engine 14 and rear differential 30, a power takeoff (PTO) assembly 13, and an auxiliary electrical system 34 to power auxiliary mechanisms to load unshredded paper and unload shredded paper.

Figure 1:
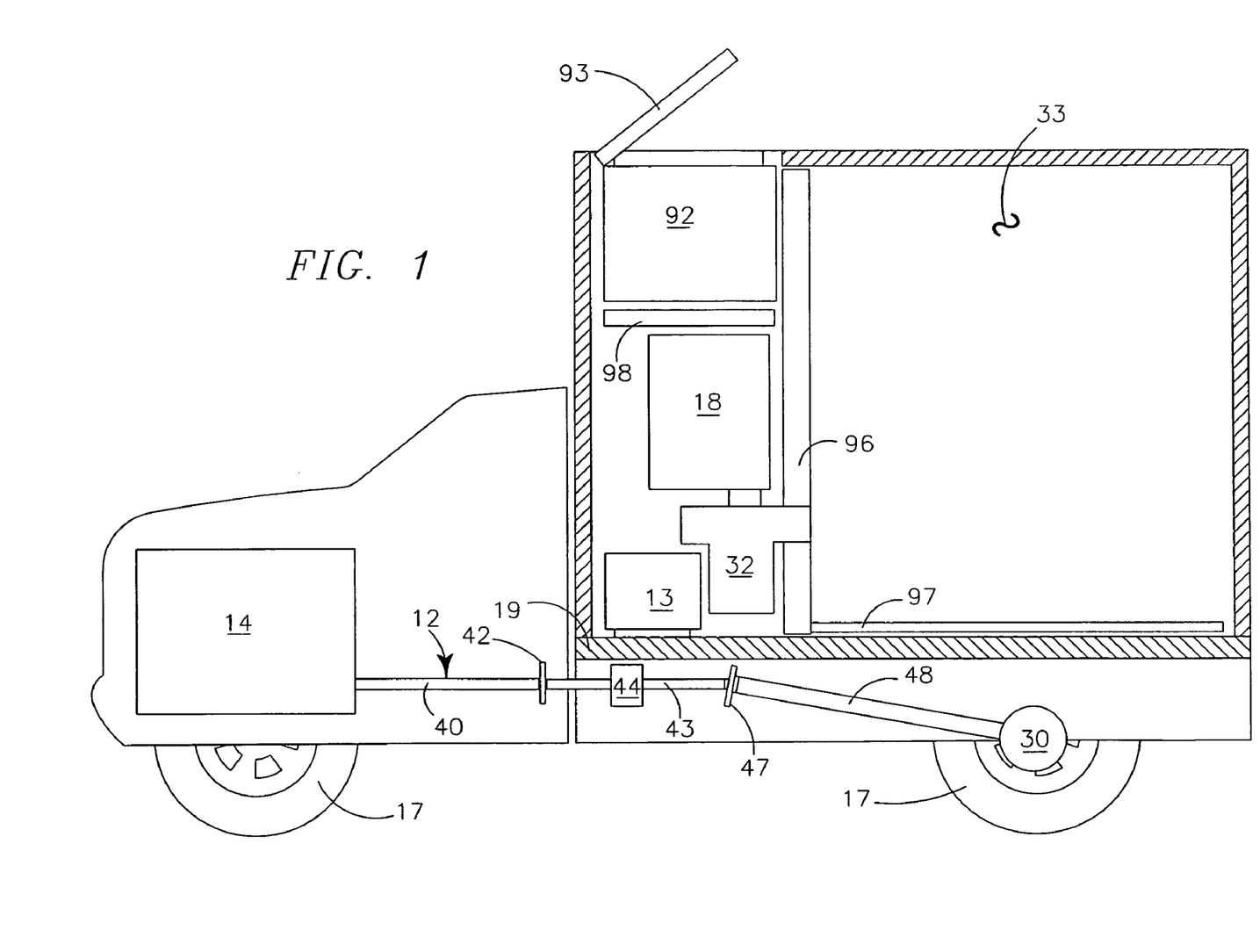
FIG. 1 is a diagrammatic view of a truck type motor vehicle carrying the instant invention to show the general positions of the various members and components in relation to one another.

My invention is operative with a motor vehicle 10 having frame 15 carrying engine 14 with speed control (not shown) at a forward portion; two speed rear differential 30 at a rearward portion; wheels, tires and suspension elements 17 at both forward and rearward portions; and equipment deck 19 at a medial portion to carry PTO assembly 13.

Figure 2:
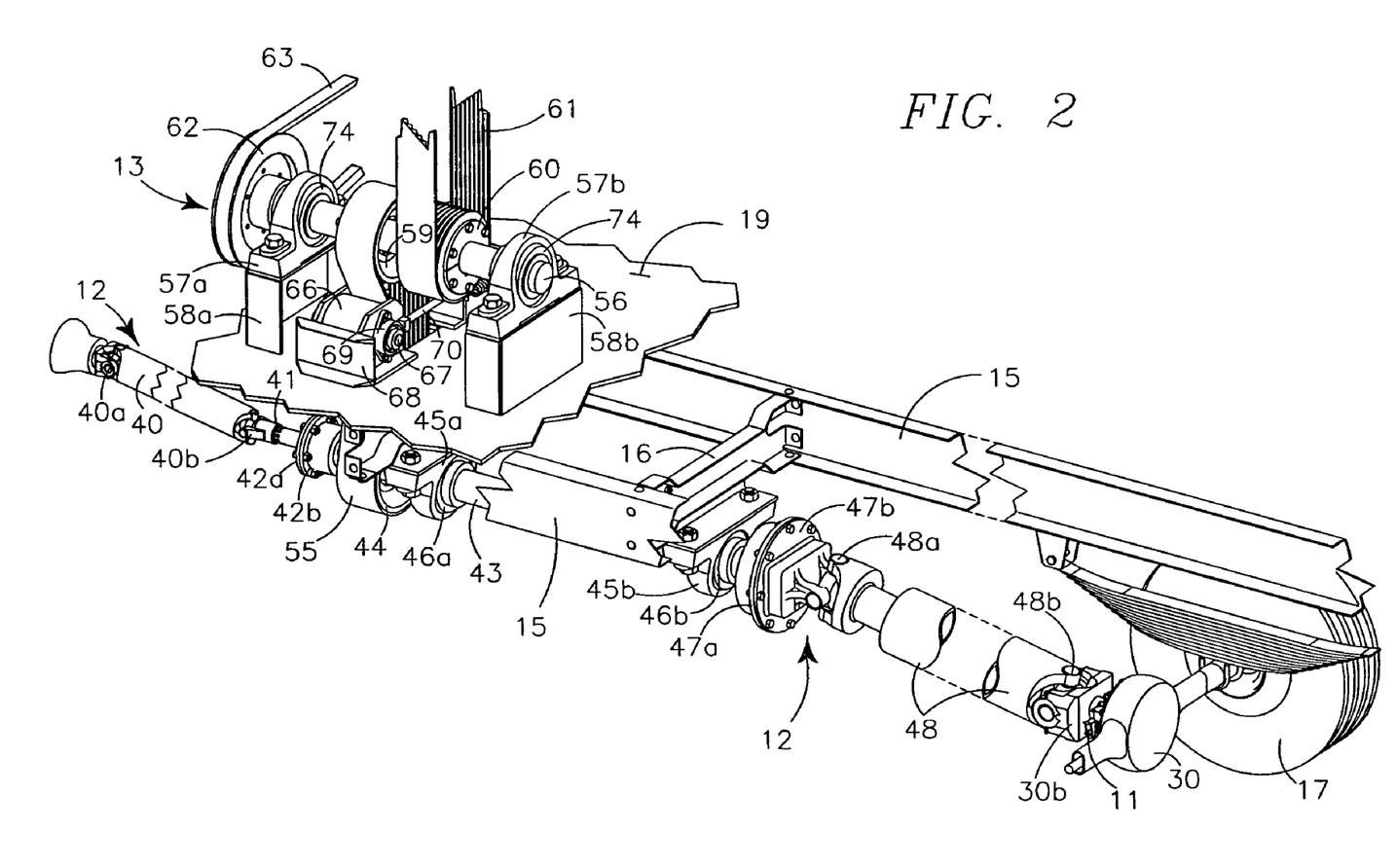
FIG. 2 is a partial isometric forward looking top and left side view of the segmented drive line, vehicle frame and PTO assembly.
Figure 3:
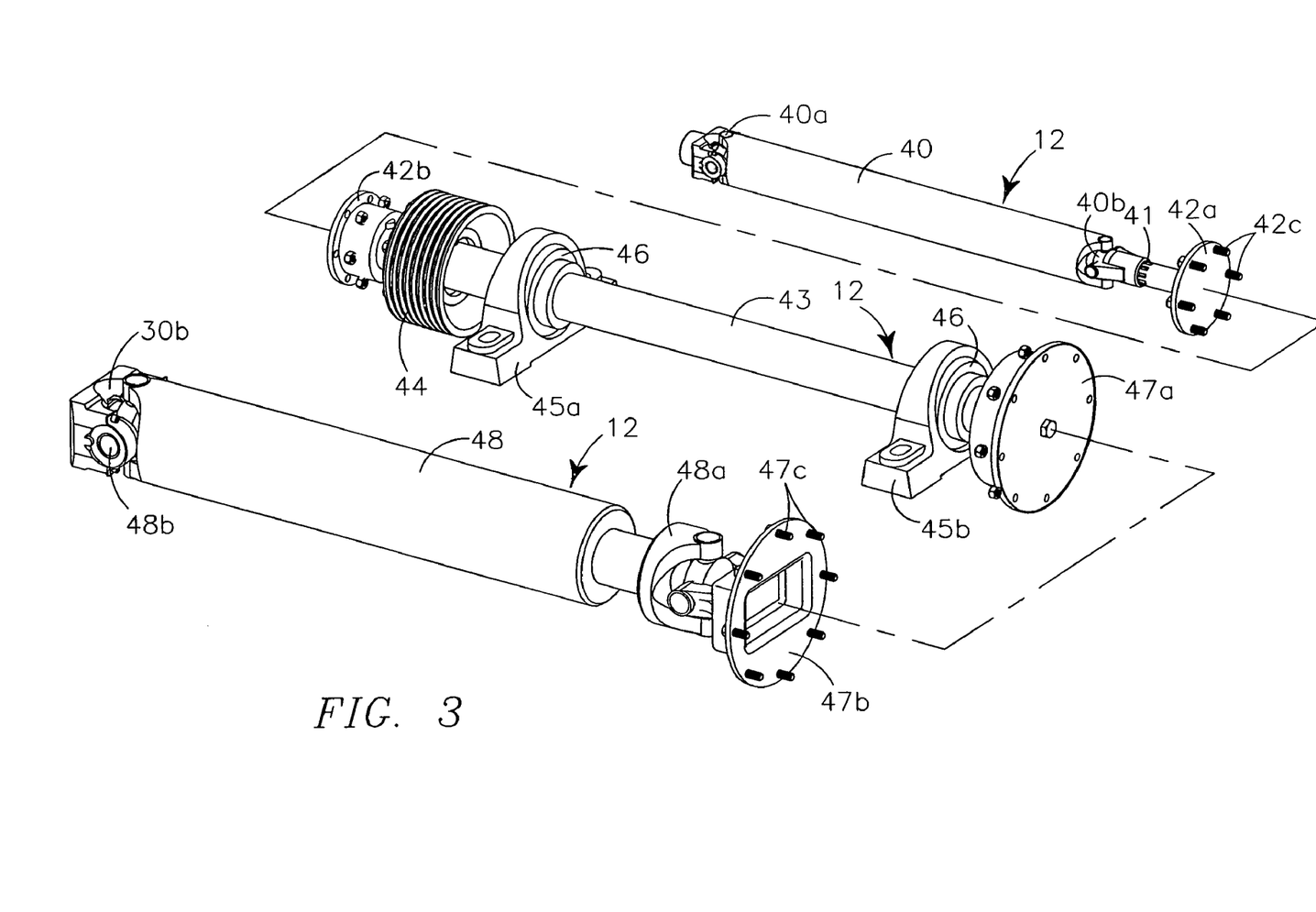
FIG. 3 is an isometric forward-looking bottom and right side view of the drive line broken into segments and isolated for clarity.

As shown in FIG. 2, segmented drive line 12 is carried adjacently below frame 15 to communicate between engine 14 and rear differential 30. As shown in FIG. 3, the segmented drive line 12 comprises forward drive shaft 40, middle drive shaft 43, and rearward drive shaft 48 interconnected to one another from front to rear respectively by universal joint 40b, spline connector 41, irrotatably joined front couplers 42a, 42b releasably fastened together by plural bolts 42c, irrotatably joined rear couplers 47a, 47b fastened together by bolts 47c. The forward end of forward drive shaft 40 carries front U joint 40a to interconnect with engine 14 and the rearward end of rearward drive shaft 48 carries rear universal joint 48b to interconnect with rear differential U joint seat 30b. Bearing brackets 45a, 45b are releasably fastened to frame crossmembers 16 and carry bearings 46 to journal middle drive shaft 43. Drive pulley 44 is irrotatably carried spacedly adjacent the forward end of middle drive shaft 43 between irrotatable front coupler 42b and forward bearing carrier 45a.

Figures 4, 5, 6:
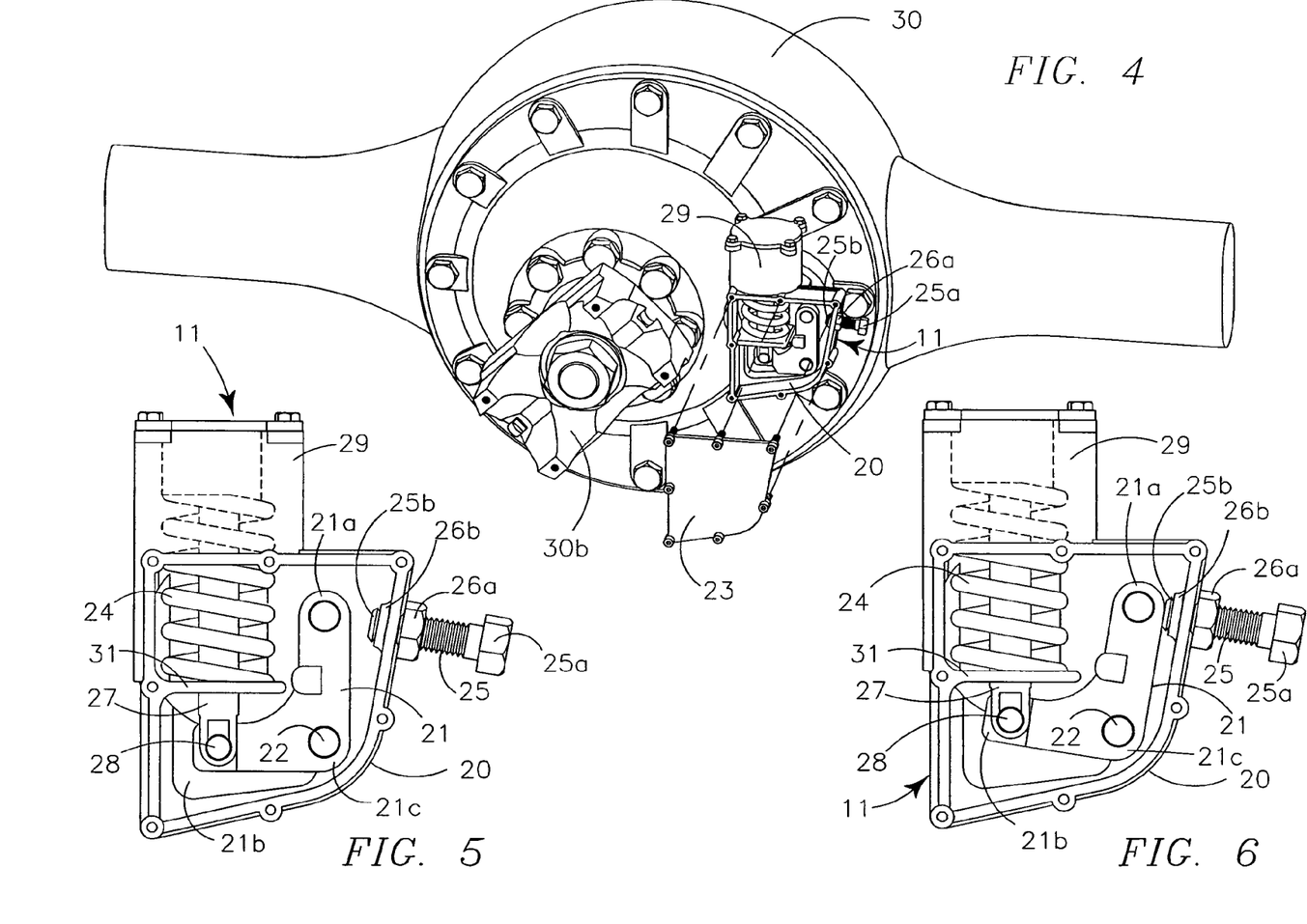
FIG. 4 is a partial isometric rearward looking top and left side view of the rear differential and gear range selector.
FIG. 5 is an orthographic rearward looking view of the gear range selector, with the housing cover removed to show the bell crank in a position whereat the rear differential is in gear for vehicle movement.
FIG. 6 is an orthographic rearward looking view of the gear range selector of FIG. 5, showing the bell crank biased by its associated spring in a neutral position between gear ranges for powering the PTO system.

As shown in FIG. 4, two speed rear differential 30 carries gear range selector 11 on its forward surface spacedly outwardly adjacent U joint seat 30b. Gear range selector 11 comprises housing 20 with removable housing cover 23, and pneumatic assembly 29 communicating through known means with the pneumatic system of vehicle 10 (not shown). At operator election by means of controls in the operator cabin (not shown), pneumatic assembly 29 causes range selector 11 to alternatively engage rear differential 30 in high gear or low gear for movement of vehicle 10. Between high gear position and low gear position is a null position whereat neither gear range is engaged and rotational motion of drive line 12 is not imparted through the rear differential 30 to vehicle wheels 17.

FIGS. 5 and 6 show gear range selector 11 carrying bell crank 21, the rotary position of which determines the selected gear ranges. Bell crank 21 defines vertical arm 21a, horizontal arm 21b, and body 21c that pivot about fulcrum pin 22. Pneumatic assembly 29 is interconnected to bell crank 21 by actuator rod 27 that extends axially through cylindrical biasing spring 24 for pivotal connection with the outer portion of horizontal arm 21b by connecting pin 28. To maintain a null position in gear range selector 11, bolt 25 having hex head 25a at the outer end and threads at the opposed inner end 25b is inserted partially into housing 20 through a hole in the housing wall (not shown) and is secured in position by inner and outer lock nuts 26b, 26a respectively so that threaded end 25b contacts vertical arm 21a of bell crank 21 when the bell crank 21 rotates clockwise when viewed from a position looking rearwardly. Biasing spring 24 is supported on housing shelf 31 and is interconnected to the upper end portion of actuator rod 27 to bias actuator rod 27 upwardly and bell crank 21 to a maximum clockwise rotation, when viewed from a position looking rearwardly, against threaded end 25b of bolt 25 which is the neutral position for gear range selector 11 as seen in FIG. 6. While in the newly created neutral position, full engine power of vehicle 10 is communicated by drive line 12 to drive pulley 44.

In contrast, as shown in FIG. 5, when pressurized air is supplied to pneumatic assembly 29, actuator rod 27 is forced vertically downward compressing biasing spring 24 against housing shelf 31 to cause bell crank 21 to rotate in a counter-clockwise direction about fulcrum pin 22 when viewed looking rearwardly. Counter clockwise rotation of bell crank 21 causes gear range selector 11 to engage the high gear range for vehicle movement.

Figure 7:
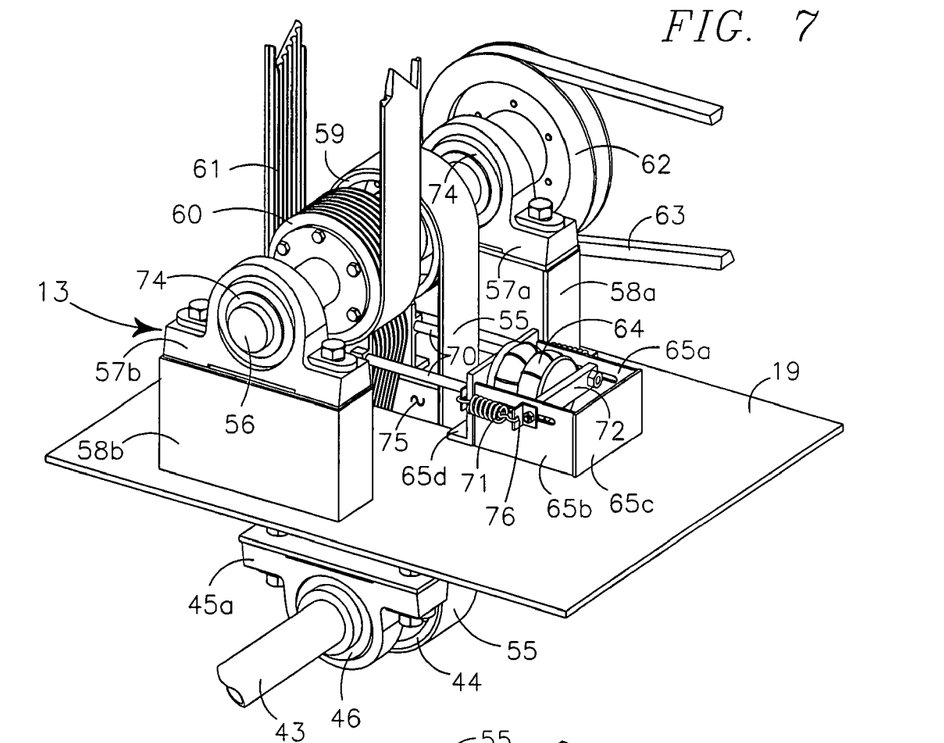
FIG. 7 is a partial isometric forward looking top and right side view of the PTO assembly and drive line.
Figure 8:
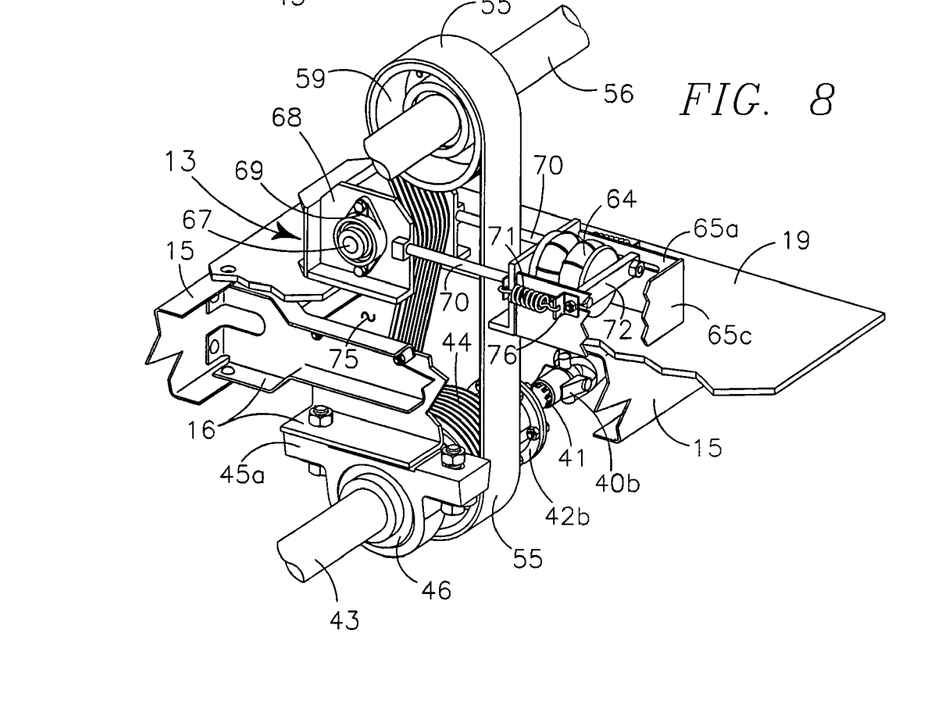
FIG. 8 is a partial cut away isometric forward looking top and right side view of the PTO assembly and a drive line showing the main drive belt communicating between the PTO assembly and drive pulley and the belt tightening carriage tensioning the main drive belt.

As shown in FIGS. 7 and 8, PTO assembly 13 is carried on equipment deck 19 supported by elongate frame 15 and frame crossmembers 16. PTO assembly 13 comprises jack shaft 56 irrotatably carrying shredder pulley 60, auger pulley 62 and slave pulley 59 spacedly arranged thereon and journaled by bearing mounts 57a, 57b each carrying bearings 74 and supported spacedly above equipment deck 19 by bearing mount supports 58a, 58b. PTO assembly 13 is mounted adjacently above drive pulley 44 and straddles orifice 75 defined in equipment deck 19. Main drive belt 55 extends through orifice 75 to communicate between drive pulley 44 on middle drive shaft 43 and slave pulley 59 on jack shaft 56 to selectively impart rotational motion of drive pulley 44 to jack shaft 56 and PTO assembly 13 responsive to lateral movement of belt tightening carriage 68. Belt tightening carriage 68 carries belt tightening pulley 66 (FIG. 2) on shaft 67 journaled in paired opposed bearing mounts 69 releasably fastened to foreword and rearward surfaces of belt tightening carriage 68. The belt tightening carriage 68 is movable laterally responsive to expansion and contraction of air bag 64 powered by the vehicle pneumatic system and carried in airbag housing 65.

Airbag housing 65 comprises forward panel 65a and similar opposed rearward panel 65b interconnected by outer panel 65c and inner belt side panel 65d to form a rectilinear perimeter that is structurally supported on equipment deck 19 outwardly adjacent a lateral edge of orifice 75. Elongate slots 73 are defined in forward and rearward panels 65a, 65b to carry crossmember 72 extending therebetween. Similar spring brackets 76 are carried at each end portion of crossmember 72 outwardly of panels 65a, 65b to releasably engage with one end portion of extension springs 71 the other end portion of which is carried by the belt side panel 65d to bias crossmember 72 toward inner belt side panel 65d. Two linkage rods 70 interconnect crossmember 72 of airbag housing 65 to belt tightening carriage 68 so that movement of crossmember 72 responsively moves belt tightening carriage 68. Airbag 64 is carried in the medial portion of airbag housing 65 between inner belt side panel 65d and crossmember 72. Responsive to expansion of airbag 64 caused by input of pressurized air from the vehicle pneumatic system, crossmember 72 and spring brackets 76 are moved laterally outwardly against their bias and away from inner belt side panel 65d. Linkage rods 70, responsive to movement of crossmember 72, move belt tightening carriage 68 inwardly causing the belt tightening pulley 66 to frictionally engage main drive belt 55 to remove slack in the main drive belt 55 and responsively causing main drive belt 55 to frictionally engage with drive pulley 44 to cause rotational motion of jack shaft 56.

Shredder pulley 60 and auger pulley 62 irrotatably carried on jack shaft 56 carry shredder drive belt 61 and auger drive belt 63 respectively. Shredder drive belt 61 communicates with paper shredder 18 while auger drive belt 63 communicates with auger 32 that moves shredded paper out of paper shredder 18 and into a storage area 33 such as a truck box rearwardly of PTO assembly 13.

Figure 9:
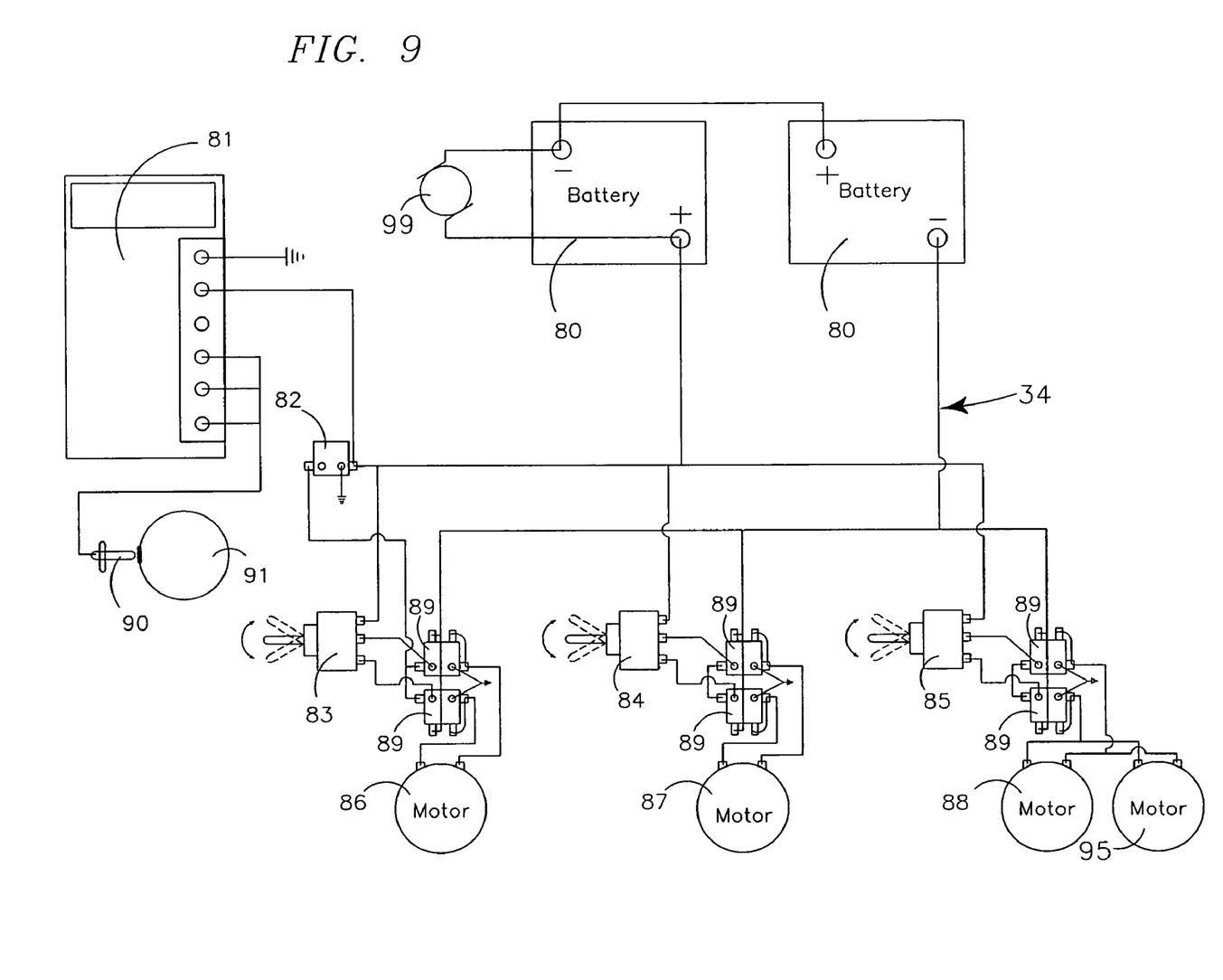
FIG. 9 is an electrical circuit diagram of the auxiliary mechanisms powering and switching circuit.

FIG. 9 shows a circuit diagram of the auxiliary electrical system 34 that powers auxiliary mechanisms to load unshredded paper and move shredded paper that operate in cooperation with the paper shredder 18 but are not powered by PTO assembly 13. Such auxiliary mechanisms include a known lift (not shown) to move a container carrying unshredded paper from ground level into hopper 92 adjacently above the paper shredder 18, an opening and closing lid 93 to cover the loading orifice of hopper 92, a paper feeder 98 that regulates the rate at which unshredded paper is moved into paper shredder 18, and an electrically powered unloading wall 96 to move shredded paper out of the storage area 33 for disposal.

These auxiliary mechanisms 93, 96 and 98, and any others, are powered by 12 volt electric motors 86, 87, 88 and 95 that are interconnected through solenoids 89 with three position switches 83, 84 and 85 that allow an operator to stop and control movement of each auxiliary mechanism in forward and reverse directions by changing polarity of current supplied to motors 86, 87, 88 and 95. Reversibility of each auxiliary mechanism 93, 96 and 98 is required because each auxiliary mechanism must move from a start position to an extreme operative position, and return to the start position at operator control.

The auxiliary electrical system 34 comprises two 6 volt batteries 80a, 80b interconnected in series to provide 12 volts of electrical current at relatively high amperage. Batteries 80a, 80b are recharged by a generator 99 which is a component of the existing electrical system of the vehicle 10 (not shown).

Lift motor 88 and hopper lid motor 95 are controlled by three position lift/lid toggle switch 85 with foreword selection on toggle switch 85 causing the hopper lid 93 to open and a lift (not shown), if any, to move paper upwardly into the hopper 92. When a container (not shown) carrying paper to be shredded reaches the top of the hopper 92, the container is inverted to empty its contents into hopper 92 through the open hopper lid 93. Reversing toggle switch 85 causes the motors 88, 95 to reverse direction and the lift, if used, to lower the container to ground level and close the hopper lid 93.

Feed motor 86, by use of known mechanical linkage (not shown) moves unshredded paper from the hopper 92 into the paper shredder 18 which operates at approximately 2000 rpm. Feed motor 86 may be operated in a foreword direction, a reverse direction or stopped by an operator using feed motor toggle switch 83. Feed governor 81, in electrical communication with feed motor 86, feed solenoid 82, and a rotation sensor having a magnetic pickup 90 and wheel sensor 91, may periodically override feed motor toggle switch 83 to interrupt electrical current to feed motor 86 responsively stopping the feed motor 86 and movement of unshredded paper into the paper shredder 18, to avoid blockage or stopping, if magnetic pickup 90 detects that the rotary speed level of paper shredder 18 falls below 2000 rpm. When the rpm level returns to 2000 rpm, feed governor 81 reactivates electrical current flow to feed motor 86.

Unload motor 87 is activated by toggle switch 84 which controls forward and rearward movement of unload wall 96 within storage area 33 of motor vehicle 10. Unload wall 96 moves forwardly and rearwardly in an elongate track 97 within storage area 33 by known mechanical linkage such as a screw drive (not shown). Rearward movement of unload wall 96 pushes shredded paper out of storage area 33. Reversal of electrical current polarity by toggle switch 84 causes the electrical current flowing through solenoids 89 to responsively reverse rotation of unload motor 87 to cause unload wall 96 to move forwardly along elongate track 97 within storage area 33 to return unload wall 96 to a storing position.

Having described the structure of my powering system for a vehicle carried paper shredder, its operation may be understood.

Motor vehicle 10 is positioned at a location where paper shredding operations are permitted and the operator is not at risk from adjacent vehicular traffic. Parking brake and vehicle pneumatic system supplying pressurized air is activated. Operator controls (not shown) are activated to remove pressurized air from pneumatic assembly 29 of gear range selector 11 responsively causing biasing spring 24 to move actuator rod 27 of the range selector 11 upwardly to rotate bell crank 21 clockwise when viewed from a position looking rearwardly. Rotation of bell crank 21, disengages differential 30 from high gear and engages the newly created neutral wherein rotational motion of drive line 12 is not communicated by differential 30 to the motor vehicle wheels and tires 17.

The operator uses the "speed control" of vehicle 10 to set the speed of engine 14 to operate at approximately 2000 rpm which responsively causes drive line 12 and middle drive shaft 43 carrying drive pulley 44 to rotate at approximately 2000 rpm. The operator thereafter activates control valves (not shown) on the vehicle pneumatic system to cause high pressure air to flow into and expand airbag 64. Expansion of airbag 64 moves crossmember 72 laterally outward to cause belt tightening carriage 68 and belt tightening pulley 66 to move laterally inwardly which removes slack from main drive belt 55 to cause drive belt 55 to frictionally engage with drive pulley 44. As drive belt 55 frictionally engages with drive pulley 44, the rotational motion of drive pulley 44 is imparted to slave pulley 59 which causes jack shaft 56 to rotate. The rotation of jack shaft 56, rotates shredder pulley 60 and auger pulley 62 which communicate with shredding apparatus 18 and auger 32 by means of shredder drive belt 61 and auger drive belt 63 respectively.

The operator loads paper to be shredded into a container (not shown), activates lift/lid toggle switch 85 to move the container vertically upwardly on a known lift (not shown) powered by lift motor 88 and hopper lid 93 is opened by hopper lid motor 95 and known mechanical linkage (not shown). The container carrying paper is emptied into the hopper 92. The hopper lid 93 is then closed as the container is removed to prevent paper from escaping from hopper 92.

Unshredded paper in hopper 92 is moved by paper feeder 98 into paper shredder 18. At operator election, the paper feeder 98 may be turned on, off, or reversed by operation of feed motor toggle switch 83. Regardless of position of feed motor toggle switch 83, feed governor 81 will automatically deactivate and reactivate paper feeder 98 to maintain paper shredder 18 operation at approximately 2000 rpm.

Paper entering the paper shredder 18 after shredding exits the paper shredder 18 through the bottom portion and passes to auger 32 adjacently below the paper shredder 18. The auger 32 is driven by auger drive belt 63 and known reduction gears to move the shredded paper into the storage area 33 rearward of an unload wall 96 where the shredded paper is stored until final disposal.

After shredding is complete, the operator disengages control valves (not shown) that allow airbag 64 to contract. Responsively, springs 71 contract to move belt tightening carriage 68 away from main drive belt 55 to provide slack in main drive belt 55 which allows drive pulley 44 to rotate without moving drive belt 55 and PTO 13. Thereafter, the operator may disengage the speed control of motor vehicle 10 to allow the engine 14 to return to an idle speed whereupon the pneumatic assembly 29 on gear range selector 11 is activated with high pressure air which responsively causes bell crank 21 to rotate counterclockwise, when viewed from a position looking rearwardly, to reengage differential 30 in high gear range, whereupon the motor vehicle 10 can be moved to the next location under its own power.

The operator may continue paper shredding operations until storage area 33 needs to be emptied at a disposal location. The rear doors (not shown) of the storage area 33 are opened and the operator activates unload motor toggle switch 84 that activates unload motor 87 which moves unload wall 96 rearwardly within storage area 33 along track 97. Rearward movement of the unload wall 96 pushes shredded paper in the storage area 33 out through the rear doors of storage area 33. When unload wall 96 has reached a rearward most position, and the storage area 33 is substantially empty, the operator reverses toggle switch 84 which responsively reverses unload motor 87 to cause the unload wall 96 to return to starting position adjacent paper shredder 18 and auger 32. Thereupon, the rear doors to the storage area 33 are closed and secured, and shredding operations may continue at the next location.

The foregoing description of my invention is necessarily of a detailed nature so that a specific embodiment may be set forth as is required, but it is to be understood that various modifications of detail, rearrangement and multiplication of parts might be resorted to without departing from the spirit, essence or scope of the invention.

Having thusly described my invention, what I desire to protect by Letters Patent, and what I claim is:

1. A powering system for a vehicle carried paper shredder, the vehicle having an frame with an engine with speed control at a forward position, a two speed rear differential at a rear position, a two piece segmented drive line having a forward drive line shaft and an irrotatably interconnected rearward drive line shaft interconnecting the engine and differential, a pneumatic system, and a storage area for shredded paper, and the paper shredder having a hopper for storage of unshredded paper, a mechanism to load unshredded paper into the paper shredder and a mechanism to unload shredded paper from the paper shredder, the powering system comprising in combination:

a middle drive line shaft, irrotatably carried between the forward drive line shaft and the rearward drive line shaft, and irrotatably carrying a drive pulley;

a main drive belt, communicating between the drive pulley carried by the middle drive shaft and a slave pulley irrotatably carried by a power takeoff jack shaft journaled in a power takeoff assembly carried on the vehicle frame, to drive the power takeoff jack shaft;

a belt tightening pulley adjacent the main drive belt between the drive pulley and the slave pulley, the belt tightening pulley journaled in the power takeoff assembly and movable by expansion and contraction of an airbag carried in an airbag housing of the power takeoff assembly and controlled by the vehicle pneumatic system to selectively remove slack in the main drive belt responsively causing the main drive belt to operatively engage with the drive pulley to communicate motion of drive pulley to the power takeoff jack shaft;

a gear range selector carried by the two speed rear differential, the gear range selector having mechanical means to stop and maintain the gear range elector in a null position between gear ranges whereat rotation of the drive line is not communicated to the rear differential; and an electrical powering system having two batteries interconnected in series to increase amperage potential supplied to electric motors powering the mechanisms to load unshredded paper and to unload shredded paper, and electrical switching means to control polarity of current supplied to the motors to selectively reverse motion of the motors.

2. The powering system of claim 1 wherein the middle drive line shaft carrying the drive pulley is supported in bearings carried in bearing brackets releasably fastened to the vehicle frame.

3. The power takeoff assembly of claim 1 further comprising:

a movable belt tightening carriage rotatably journaling a belt tightening shaft extending therethrough and carrying the belt tightening pulley;

an airbag housing interconnected to the belt tightening carriage by linkage rods, the air bag housing having a rectilinear periphery formed by forward and rearward side panels extending parallel to the linkage rods and interconnected by perpendicular end panels with a crossmember extending through and between the side panels to move in elongate slots defined in the side panels;

an airbag carried in the air bag housing between the crossmember and an end panel proximal to the belt tightening carriage so that expansion and contraction of the air bag causes the crossmember to move toward and away from the end panel proximal to the belt tightening carriage, the linkage rods interconnecting the belt tightening carriage and the crossmember so that movement of the crossmember is communicated to the belt tightening carriage to cause the belt tightening pulley to selectively remove and create slack in the main drive belt; and springs interconnecting the crossmember and air bag housing end proximal to the belt tightening carriage to bias the crossmember to a position whereat the belt tightening pulley is in a slack position and not engaged with the main drive belt.

4. The powering system of claim 1 wherein the mechanical means to stop and maintain the gear range selector in the null position between gear ranges is a bolt extending partially into the gear range selector housing with the innermost end of the bolt stopping and maintaining the gear range selector at the null position until disengaged by the operator.

5. The powering system of claim 1 wherein:

the gear range selector on the vehicle two speed rear differential provides a bell crank carried within the gear range selector housing for pivotal motion causing the rear differential to optionally engage with high gear and low gear, the bell crank being spring biased toward one gear position; and a bolt extending partially into the range selector housing with the inner most end of the bolt communicating with, stopping and maintaining the bell crank at a null position between high and low gear ranges until disengaged by operator.

6. The powering system of claim 1 having an auxiliary electric system to power paper shredder auxiliary mechanisms comprising:

at least two six volt batteries in series connection with each other and with the generator of the motor vehicle;

at least one electric motor to power the mechanism to load unshredded paper into the hopper;

a feed electric motor to power the paper feeder to move unshredded paper from the hopper into the paper shredder;

an unload electric motor to power an unload wall to remove shredded paper from the storage area;

manual toggle switch means in series with each motor to selectively start, stop and reverse each motor; and a feed governor having a magnetic sensor to sense rotary speed of the paper shredder to responsively override the feed motor toggle switch to maintain rotary speed of the paper shredder at a constant speed of approximately 2000 rpm.

7. A powering system for a vehicle carried paper shredder, the vehicle having a frame with an engine with speed control at a forward position, a two speed rear differential at a rear position, a two piece segmented drive line having a forward drive line shaft and an irrotatably interconnected rearward drive line shaft interconnecting the engine and differential, a pneumatic system, and a storage area for shredded paper, and the paper shredder having a hopper for storage of unshredded paper, a mechanism to load unshredded paper into the paper shredder and a mechanism to unload shredded paper from the paper shredder, the powering system comprising in combination:

a middle drive line shaft, irrotatably carried between the forward drive line shaft and the rearward drive line shaft, and irrotatably carrying a drive pulley;

a main drive belt, communicating between the drive pulley carried by the middle drive line shaft and a slave pulley irrotatably carried by a power takeoff jack shaft journaled in a power takeoff assembly carried on the vehicle frame, to drive the power takeoff jack shaft;

a belt tightening pulley adjacent the main drive belt between the drive pulley and the slave pulley, the belt tightening pulley journaled in the power takeoff assembly and movable by expansion and contraction of an airbag carried in an airbag housing of the power takeoff assembly and controlled by the vehicle pneumatic system to selectively remove slack in the main drive belt responsively causing the main drive belt to operatively engage with the drive pulley to communicate motion of drive pulley to the power takeoff jack shaft;

a gear range selector carried by the two speed rear differential, the gear range selector having mechanical means to stop and maintain the gear range selector in a null position between gear ranges whereat rotation of the drive line is not communicated to the rear differential;

an auxiliary electric system having;

at least two six volt batteries in series connection with each other and with the generator of the motor vehicle;

at least one electric motor to power the mechanism to load unshredded paper into the hopper;

a fee electric motor to power the paper feeder to move unshredded paper from the hopper into the paper shredder;

an unload electric motor to power an unload wall to remove shredded paper from the storage area;

manual toggle switch means in series with each motor to selectively start, stop and reverse each motor; and a feed governor having a magnetic sensor to sense rotary speed of the paper shredder to responsively override the feed motor toggle switch to maintain rotary speed of the paper shredder at a constant speed of approximately 2000 rpm.

* * * * *